United States Patent [19]

Klein et al.

[11] Patent Number: 4,936,787
[45] Date of Patent: Jun. 26, 1990

[54] AUTOMATED CONNECTION FOR A VEHICLE RADIO

[75] Inventors: Frank H. Klein; Steven F. Selby, both of Huntsville, Ala.

[73] Assignee: Acustar, Inc., Troy, Mich.

[21] Appl. No.: 348,327

[22] Filed: May 4, 1989

[51] Int. Cl.⁵ .............................................. H01R 9/09
[52] U.S. Cl. .................................... 439/76; 439/78; 29/832; 29/834
[58] Field of Search ...................... 439/76, 78, 79, 547; 29/832, 834, 840

[56] References Cited

U.S. PATENT DOCUMENTS

| | | | |
|---|---|---|---|
| 3,895,267 | 7/1975 | Gordon et al. | 439/78 |
| 4,179,178 | 12/1979 | Bachman et al. | 439/76 |
| 4,626,962 | 12/1986 | Ahn et al. | 439/76 |
| 4,737,888 | 4/1988 | Bodnar et al. | 439/78 |
| 4,746,304 | 5/1988 | Asai | 439/248 |
| 4,811,165 | 3/1989 | Currier et al. | 439/76 |

Primary Examiner—P. Austin Bradley
Attorney, Agent, or Firm—Edward A. Craig

[57] ABSTRACT

The present invention is an automated connection for a vehicle radio. A printed circuit board and electrical receptacle are disposed within a housing and secured thereto. An interface is secured to the housing for engagement with the receptacle to allow electrical connection between an external object and the receptacle.

11 Claims, 3 Drawing Sheets

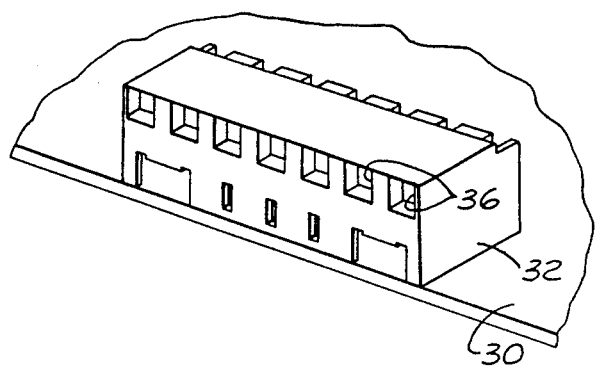
FIG.4
FIG.5
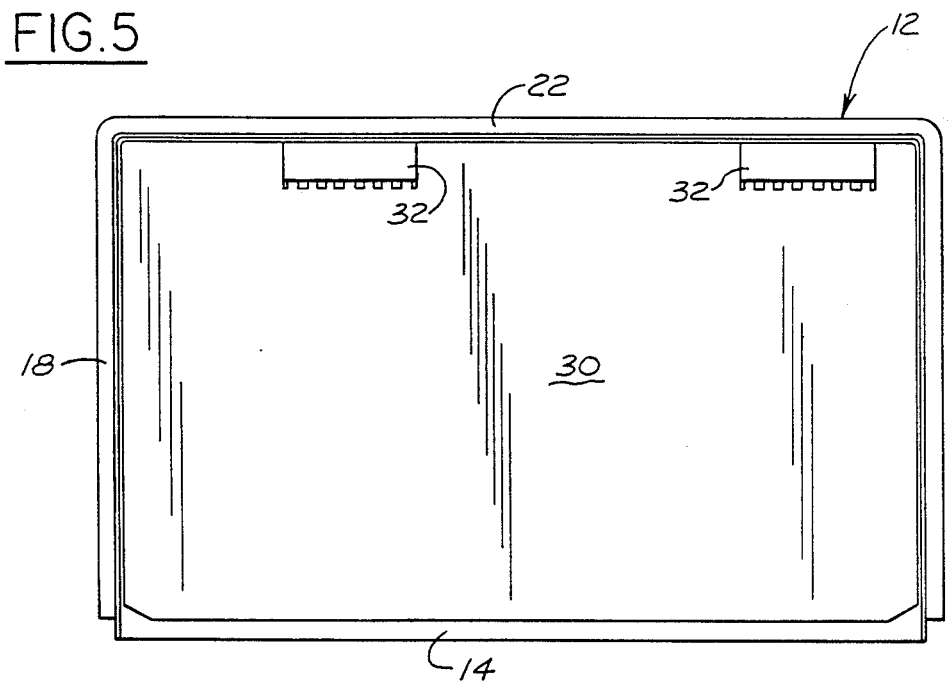
FIG.6
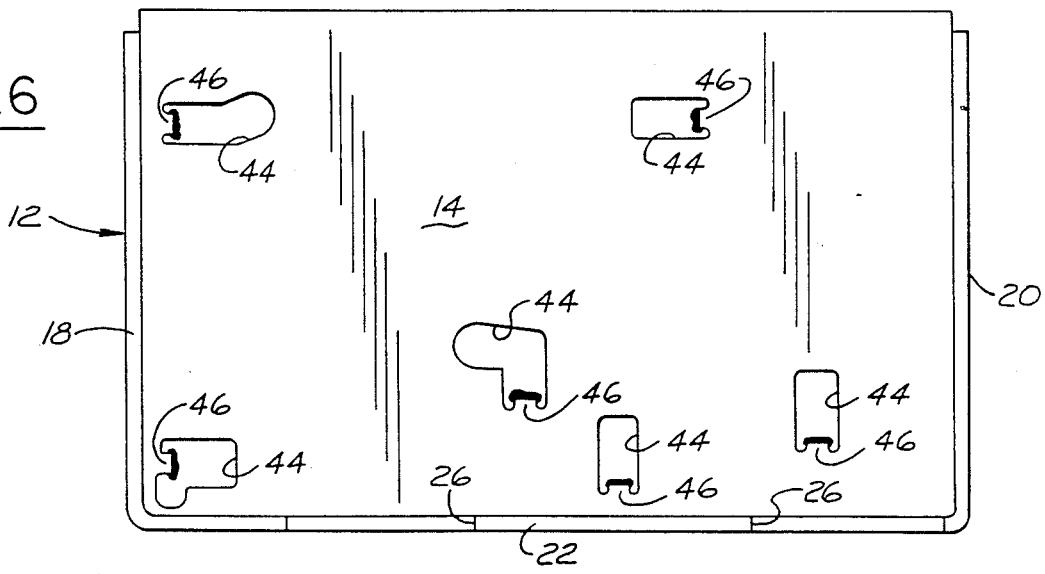

4,936,787

AUTOMATED CONNECTION FOR A VEHICLE RADIO

BACKGROUND OF THE INVENTION

1. Field of the Invention

The present invention relates generally to a vehicle radio, and more particularly to an automated connection for a vehicle radio.

2. Description of Related Art

Currently, a radio for a vehicle such as an automobile generally includes a receiver or radio and at least one speaker. The speaker and power feed output are typically connected to the radio connector by wires. Commonly, hand connected cable assemblies are used to mate the wires to the radio connector.

It is, therefore, an object of the present invention to provide connection for a vehicle radio which can be used in an automated assembly environment.

It is another object of the present invention to eliminate hand connected cable assemblies for mating the wires to the radio.

SUMMARY OF THE INVENTION

Accordingly, the present invention is an automated connection for a vehicle radio. The vehicle radio includes a housing having a top plate, bottom plate and side plates. A printed circuit board is disposed within the housing and an electrical receptacle is secured to the printed circuit board. An interface removably engages the receptacle and the housing to allow electrical connection between an external object and the receptacle.

The present invention also provides a method of assembling a vehicle radio including a housing having a top plate, bottom plate and side plates. The method includes the steps of securing an electrical receptacle to a printed circuit board and placing them within the housing. The method also includes securing the printed circuit board to the housing and securing an interface to the housing for engagement with the receptacle to allow electrical connection between an external object and the receptacle.

One advantage of the present invention is that hand connected cable assemblies are eliminated. Instead, an interface is provided to engage the receptacle and allow an external object such as an electrical connector connected to a speaker or power feed input to engage the interface for electrical connection therebetween. Another advantage of the present invention is that the assembly or connector can be automated such that robots or an assembly line can be used to assemble the radio.

Other advantages of the present invention will be readily appreciated as the same becomes better understood after reading the following description in connection with the accompanying drawings.

BRIEF DESCRIPTION OF THE DRAWINGS

FIG. 4 is a partial perspective view of the receptacle soldered to the circuit board as illustrated in FIG. 2.

FIG. 5 is a top plan view of the partially assembled vehicle radio of FIG. 1 with the top removed.

FIG. 6 is a bottom plan view of the partially assembled vehicle radio of FIG. 1.

DESCRIPTION OF THE PREFERRED EMBODIMENT

Figure 1:
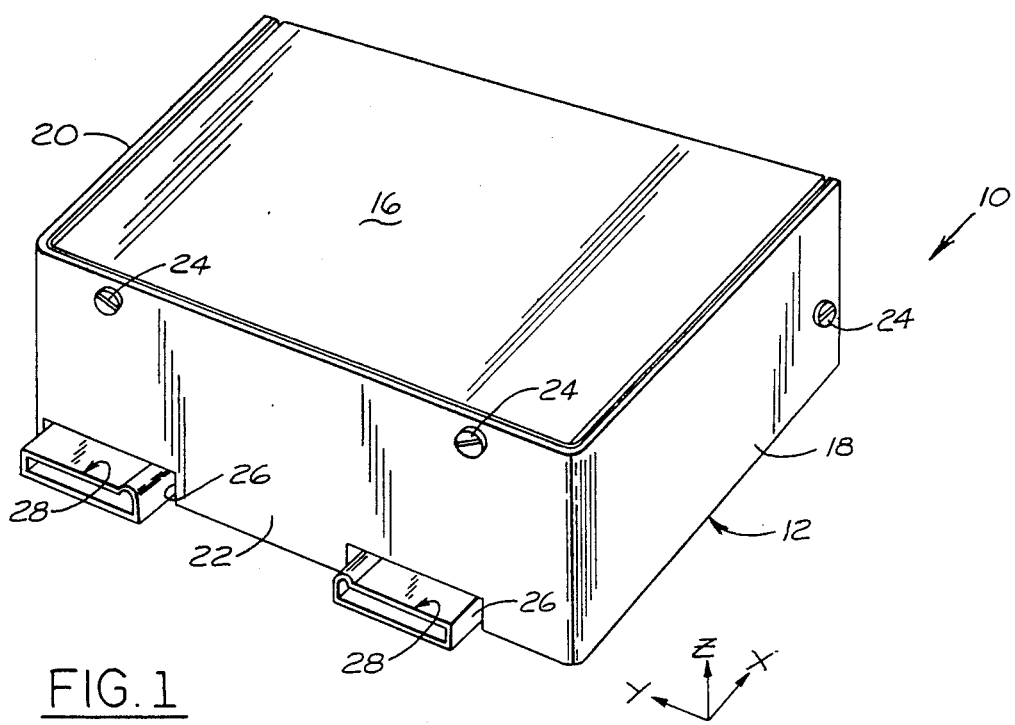
FIG. 1 is a perspective view of a partially assembled vehicle radio constructed in accordance with the principles of the present invention.

Referring to FIG. 1, a partially assembled radio 10 for a vehicle (not shown) such as an automobile is shown. The partially assembled radio 10 includes a generally rectangular housing, generally indicated at 12. The housing 12 comprises a generally rectangular and planar bottom plate 14 (FIG. 6), a top plate 16, a pair of side plates 18 and 20, and an end or rear plate 22. The side plates 18 and 20 and rear plate 22 are integrally formed to a generally "U" shape to form three sides of the housing 12. The bottom and top plates 14 and 16, side plates 18 and 20 and rear plate 22 are secured together by means such as metal screws 24. It should be appreciated that the plates of the housing 12 include suitable flanges (not shown) and apertures (not shown) for allowing the plates to be secured together by the metal screws 24.

The rear plate 22 includes at least one, preferably a pair of laterally spaced apertures 26 formed near the bottom edge thereof. The apertures 26 are generally rectangular in shape and receive an electrical connector or interface 28 to be described.

Figure 2:
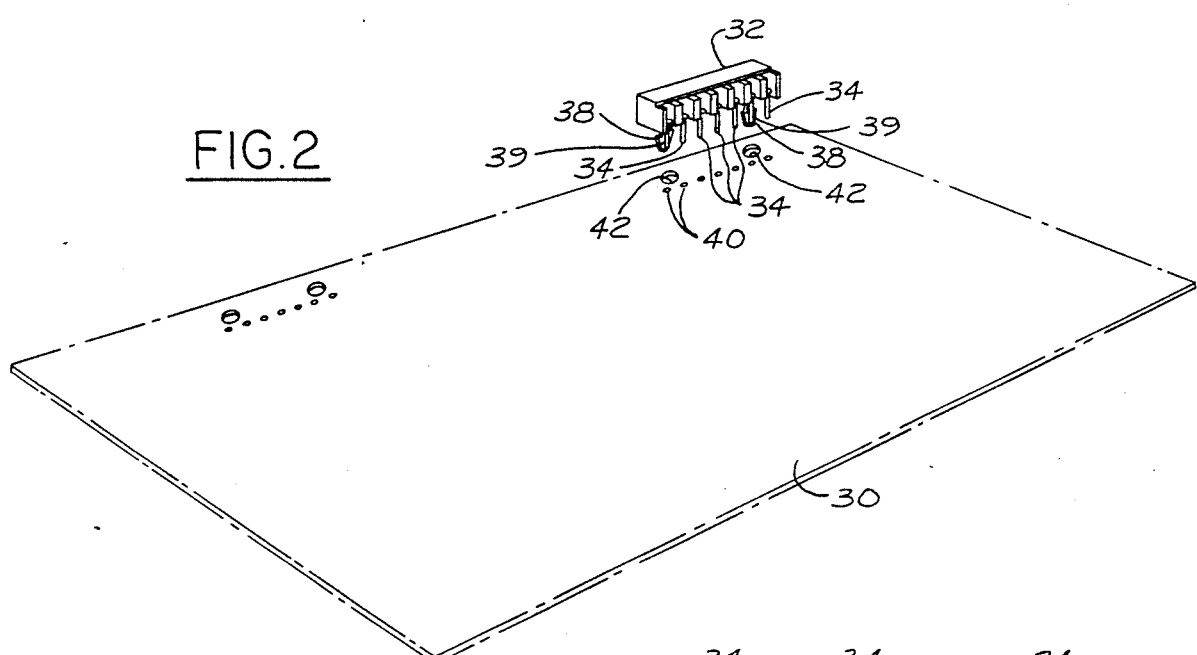
FIG. 2 is an exploded perspective view of a circuit board and receptacle according to the present invention.
Figure 3:
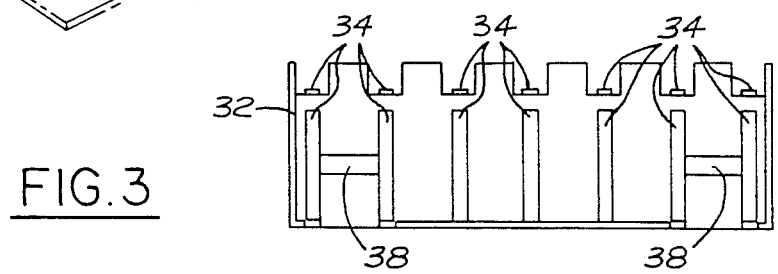
FIG. 3 is a plan view of the receptacle shown in FIG. 2.

Referring to FIGS. 2 through 4, the partially assembled radio 10 includes a printed circuit (PC) board 30 and an electrical connector or receptacle 32 which is used for a speaker (not shown) and a power feed input (not shown) adapted to be electrically connected to the radio 10. The receptacle 32 is generally rectangular in shape and has a plurality of laterally spaced and downwardly extending circuit projections or terminals 34. The receptacle 32 also has a plurality of laterally spaced apertures 36 extending longitudinally therethrough. The circuit terminals 34 are generally "L" shaped and have one end disposed within a corresponding aperture 36 for electrical connection with the interface 28 and the other end extending downwardly for mating with the PC board 30. It should be appreciated that the one end of the circuit terminal 34 disposed in the aperture 36 is shaped to act as a leaf spring for engagement with projections or pins 48 removably disposed in the aperture 36 by the interface 28.

The receptacle 32 also includes a pair of laterally spaced locking projections 38 extending downwardly from the bottom thereof. The locking projections 38 include a generally "V" shaped free end and a longitudinally extending slot 39 partially along the length thereof to allow the lateral sides of the locking projection to flex or deflect together for a function to be described. Preferably, the receptacle 32 is made of a plastic material such as nylon and the terminals 34 are made of a metal material such as brass coated with tin-lead.

The PC board 30 is generally a rectangular planar plate having printed circuits (not shown) for electrical connection to various electrical components (not shown). The PC board 30 includes a first row of terminal apertures 40 laterally spaced to receive the corresponding circuit terminals 34. The PC board 30 also includes a second row of locking apertures 42 longitudinally spaced from the first row. Preferably, the second row has a pair of laterally spaced locking apertures 42 to receive the corresponding locking projections 38. The locking apertures 42 have a diameter greater than the terminal apertures 40 but less than the width of the free end of the locking projections 38.

During assembly, the receptacle 32 is moved toward the PC board 30 until the circuit terminals 34 and locking projections 38 are disposed in the terminal and locking apertures 40 and 42, respectively. The free end of locking projections 38 flex together to fit within the locking apertures 40 and resiliently return to their original width after passing therethrough to secure the receptacle 32 to the PC board 30. The circuit terminals 34 are then secured to the PC board 30 by means such as soldering.

Referring to FIGS. 5 and 6, the PC board 30 with the attached receptacle 32 are placed inside the housing 12 along a "z" or vertical axis extending generally perpendicular to the bottom and top plates 14 and 16. The bottom plate 14 includes a plurality of apertures 44 extending through it and form a tab 46 extending into the aperture 44 and the housing 12. The PC board 30 abuts or contacts the tabs 46 and is then secured to the bottom plate 14 by means such as soldering of the PC board 30 to the tabs 46. It should be appreciated that the PC board 30 is elevated a distance such as five millimeters (5 mm) above the bottom plate 14.

Figure 7:
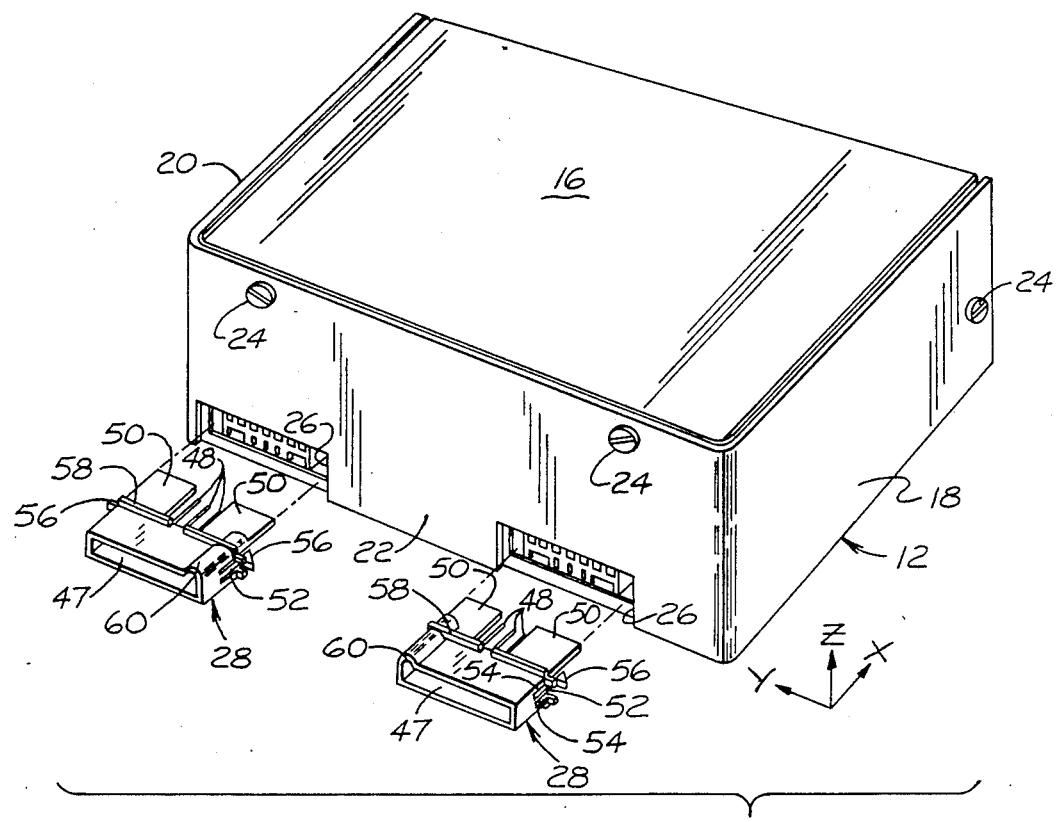
FIG. 7 is an exploded perspective view of the partially assembled vehicle radio of FIG. 1 and an interface according to the present invention.
Figure 8:
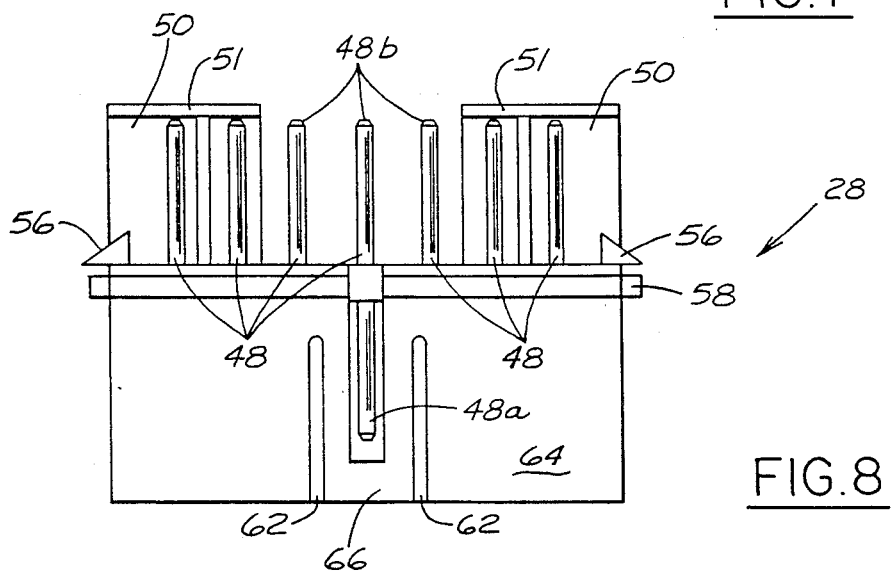
FIG. 8 is a plan view of the interface of FIG. 7.

Referring to FIGS. 7 and 8, the partially assembled radio 10 includes the interface 28 for mating and electrical connection with each of the receptacles 32. The interface 28 is generally rectangular in shape and has a generally rectangular cavity 47 formed in one end. The receptacle 32 also has a plurality of laterally spaced pins 48 extending longitudinally outward. The pins 48 have a first end 48a extending into the cavity 47 for connection to an electrical connector or wires (not shown) for the speaker and power feed input. The pins 48 also have a second end 48b extending outwardly for connection with the circuit terminals 34.

The interface 28 also includes a pair of laterally spaced and longitudinal extending guide members 50. The guide members 50 have an inclined surface 51 which is adapted to abut a corner of the upper surface of the receptacle 32 to locate the pins 48 with the apertures 36. The guide members 50 are adapted to be disposed in a space between the upper surface of the receptacle 32 and the housing 12 in the aperture 26 thereof to resist rotation between the receptacle 32 and the interface 28 when the interface 28 is moved into mating engagement with the receptacle 32.

The interface 28 also includes a pair of locking tabs 52, one for each side, for removably securing the interface 28 to the housing 12. The locking tab 52 is formed by a pair of longitudinally extending slots 54 in each lateral side of the interface 28. The slots 54 allow the locking tab 52 to be deflected laterally inward toward each other for insertion into the apertures 26 of the housing 12. The locking tab 52 has a triangular shaped portion 56 at the free end for engaging the housing 12.

The interface 28 further includes an outwardly extending wall 58 which acts as a stop for limiting the depth of insertion of the pins 48 into the apertures 36 of the receptacle 32. The interface 28 includes a semi-circular raised portion 60 on the upper surface near one side thereof for mating with a corresponding shape (not shown) in the apertures 26 of the housing 12 for ensuring proper connection of the speaker and power feed input to the corresponding receptacle 28. The interface 28 also includes a pair of laterally spaced and longitudinally extending slots 62 in a bottom surface 64 to form a deflectable tab 66 to allow another connector (not shown) to be disposed within the cavity 47 for mating engagement or connection with the first end 48a of the pins 48. Preferably, the interface 28 is made of a plastic material such as polyethylene oxide having the pins 48 made of a metal such as brass coated with tin-lead.

The present invention also provides a method of assembly for the partially assembled radio 10. During assembly of the partially assembled radio 10, the receptacle 32 is placed on the PC board 30 and secured thereto as previously described. The PC board 30 and attached receptacle 32 are placed on the tabs 46 of the bottom plate 14 and secured thereto by soldering of the PC board 30 to the tabs 46. The bottom plate 14 is slid into the housing 12 formed by the side and rear plates 16, 18 and 20, respectively, and secured together by the screws 24. The interfaces 28 are inserted into the apertures 26 of the housing 12. The guide members 50 engage the upper corner of the receptacle 32 and housing 12 such that the pins 48 slide within the apertures 36 of the receptacle 32 such that the second end 48b engages the circuit terminals 34. The portion 56 engages the housing 12 to deflect the locking tab 52 laterally inward until the portion 56 is past the rear plate 22. When this occurs, the locking tab 52 returns to its original position such that the portion 56 prevents the interface 28 from being moved longitudinally relative to the housing 12 until the locking tabs 52 are deflected inwardly again. The partially assembled radio 10 may be disassembled by removing the screws 24, placing the bottom plate 14 on a planar surface and pulling or sliding the bottom plate 14 from the remainder of the housing 12. It should be appreciated that the PC board 30 may then be repaired with the interface 28 still attached to the housing 12. The method may then be reversed for reassembly.

The present invention has been described in an illustrative manner. It is to be understood that the terminology which has been used is intended to be in the nature of words of description rather than of limitation.

Obviously, many modifications and variations of the present invention are possible in light of the above teachings. Therefore, within the scope of the appended claims, the present invention may be practiced otherwise than as specifically described.

What is claimed is:

1. An automated connection for a vehicle radio including a housing having a top plate, bottom plate and side plates, comprising:
   a printed circuit board disposed within the housing and secured to the bottom plate;
   at least one electrical receptacle secured to said printed circuit board;
   one of the side plates having an aperture corresponding to the location of said receptacle; and
   an interface removably secured to the housing and engaging said receptacle through the aperture to allow electrical connection between an external object and said receptacle.

2. The automated connection as set forth in claim 1 wherein said receptacle has a plurality of circuit terminals, said printed circuit board having a plurality of circuit apertures, said circuit terminals being disposed within said circuit apertures and soldered therein.

3. The automated connection as set forth in claim 2 wherein said receptacle has a plurality of outwardly extending locking projections, said printed circuit board having corresponding locking apertures, said locking projections being removable disposed within said locking apertures.

4. The automated connection as set forth in claim 3 wherein said interface includes a pair of laterally spaced locking tabs with an enlarged portion at a free end thereof for deflecting inward when engaging the side plate to allow said interface to engage said receptacle through the aperture and returning to an undeflected position when moved past the side plate to prevent removal of said interface from the housing.

5. A method of partially assembling a vehicle radio including a housing having a top plate, bottom plate and side plates, said method comprising the steps of:
 securing an electrical receptacle to a printed circuit board;
 placing the printed circuit board and receptacle within the housing;
 securing the printed circuit board to the housing; and
 securing an interface to the housing for engagement with the receptacle to allow electrical connection between an external object and the receptacle.

6. A method as set forth in claim 5 wherein said step of securing the electrical receptacle to the printed circuit board comprises soldering circuit terminals of the receptacle to the printed circuit board.

7. A method as set forth in claim 6 wherein said step of placing the printed circuit board within the housing comprises disposing the printed circuit board within the housing on tabs of the bottom plate to elevate the printed circuit board above the bottom plate.

8. A method as set forth in claim 7 wherein said step of securing the printed circuit board to the housing comprises soldering the printed circuit board to the tabs formed in the bottom plate and extending into the housing.

9. A method as set forth in claim 8 wherein said step of securing the interface to the housing comprises moving an interface within an aperture formed in the housing, deflecting locking tabs on the interface inward, engaging the receptacle, and returning the locking tabs to their original undeflected position to prevent removal of the interface from the housing.

10. A partially assembled vehicle radio comprising:
 a housing having a top plate, bottom plate and side plates;
 a printed circuit board disposed within said housing and secured to said bottom plate;
 at least one electrical receptacle secured to said printed circuit board;
 one of said side plates having an aperture corresponding to the location of said receptacle;
 an interface removably secured to said housing and engaging said receptacle through said aperture to allow electrical connection between an external object and said receptacle;
 wherein said receptacle has a plurality of circuit terminals, said printed circuit board having a plurality of circuit apertures, said circuit terminals being disposed within said circuit apertures and soldered therein;
 wherein said receptacle has a plurality of outwardly extending locking projections, said printed circuit board having corresponding locking apertures, said locking projections being removable disposed within said locking apertures; and
 wherein said interface includes a pair of laterally spaced locking tabs with an enlarged portion at a free end thereof for deflecting inward when engaging said side plate to allow said interface to engage said receptacle through said aperture and returning to an undeflected position when moved past said aperture to prevent removal of said interface from said housing.

11. A method of partially assembling a vehicle radio including a housing having a top plate, bottom plate and side plates, said method comprising the steps of:
 securing an electrical receptacle to a printed circuit board by soldering circuit terminals of the receptacle to the printed circuit board;
 placing the printed circuit board and receptacle within the housing to abut tabs extending upwardly from the bottom plate and into the housing;
 soldering the printed circuit board to the tabs of the bottom plate; and
 securing an interface to the housing for engagement with the receptacle to allow electrical connection between an external object and the receptacle;
 wherein said step of securing the interface to the housing comprises moving an interface within an aperture formed in the housing, deflecting locking tabs on the interface inward, engaging the receptacle, and returning the locking tabs to their original undeflected position to prevent removal of the interface from the housing.

* * * * *